United States Patent Office 2,968,543
Patented Jan. 17, 1961

2,968,543

PROCESS FOR THE PREPARATION OF COMPOSITE FERTILIZERS CONTAINING PHOSPHATE

Hugo Nees, Cologne-Brueck, Walter Buettgens, Cologne-Vingst, and Karl Geiersberger, Cologne-Deu.z, Germany, assignors to Chemische Fabrik Kalk G.m.b.H.

No Drawing. Filed Nov. 30, 1955, Ser. No. 550,210

Claims priority, application Germany Dec. 1, 1954

12 Claims. (Cl. 71—37)

The description which follows relates to an improved process for producing phosphate-containing fertilizers.

In the preparation of composite fertilizers containing phosphate, especially those in which the proportion of Ca to $P_2O_5$ is from 1.5 to 2.4, and ignoring a calcium content present in the form of calcium sulphate, by the treatment of crude phosphate with nitric acid in combination with sulphuric acid or/and phosphoric acid followed by neutralization of the disintegrated mixture with ammonia, it is recognized that it is difficult to carry out the ammoniating so that the phosphoric acid contained in the finished fertilizer is practically completely soluble in ammonium citrate solution and remains so, even if the fertilizer is stocked for a long period.

To overcome this difficulty numerous suggestions have been made. One of these suggestions, according to the French Patent No. 1,041,400, consists in adding to the disintegration mixture, before the neutralization thereof, equimolecular quantities of magnesium and sulphate ions, so that there are at least 20 molecules of magnesium and 20 molecules of $SO_4$ to 100 molecules of $P_2O_5$. According to the French Patent No. 1,031,992 by the same applicant, the addition should take place at any stage in the production of the phosphate fertilizer in such quantities that the magnesium content emanating from the quantity of the added magnesium compound amounts to from 0.1 to 2% of the finished fertilizer.

However, in the French Patent No. 1,041,400 it is stated regarding the process described in the French Patent No. 1,031,992 that the magnesium compound is added to the nitric acid disintegration (see French Patent No. 1,041,400, page 1, left column) so that in both processes covered by the above-mentioned patents the place where the stabilizer is added is the same, namely in the disintegration product. It is also stated in French Patent No. 1,041,400 with regard to quantity of magnesium used that a quantity less than 20 molecules Mg per 100 molecules of $P_2O_5$ would only effect an incomplete solubility of the phosphoric acid in the ammonium citrate solution. A similar statement is also contained in the publication of M. M. Louis Andres amongst others, dealing with the same subject (see Comptes Rend. 234, 1952, 33, pages 2285 to 2287, particularly 2286, last paragraph).

To attain the same object in the German Patent No. 891,275, the owner of which is identical with the owner of the above-mentioned French patent, ferrous ions are added in such quantities that there are at least 20 gram molecules of iron to 100 molecules of the total of the phosphoric acid. The same place of introduction and the same molecular relationship is claimed by the same owner for the above-mentioned purpose in the Swiss Patent 300,032 regarding the addition of aluminum ions.

It has now been discovered that composite fertilizers containing phosphate, in particular those in which the Ca/$P_2O_5$ ratio equals 1.5 to 2.4; ignoring the calcium content present in the form of $CaSO_4$; and in which the phosphoric acid is present in the form practically completely soluble in ammonium citrate solution and remains constant when stored for a long period; are obtained by decomposing crude phosphates with nitric acid together with sulphuric acid or/and phosphoric acid and ammoniating the decomposition mixture in the presence of stabilizing metal ions. This results if magnesium, aluminum or ferrous iron ions are added to the ammoniated mixture at a pH value of 2.5 to 6.4 preferably 3 to 6, in such quantities that there are 2 to 12 preferably 4 to 8 gram molecules of magnesium, aluminum or ferrous iron to 100 molecules of the whole of the phosphoric acid. In the process according to the invention, therefore, much smaller quantities of stabilizing magnesium, aluminum or ferrous iron ions are required than were hitherto necessary for obtaining the same effect. Apart from the above-named metal ions, nickel and manganese ions, the stabilizing action of which is known, can be used with equal success at the place of introduction and in the quantitative proportions specified by the invention. It has likewise been discovered that ferric iron, zinc, cobalt and copper ions, the stabilizing action of which was not hitherto known, can be introduced equally successfully under the process conditions according to the invention.

The ions of each of the above-mentioned metals can be used alone or together with those of one or more of the other metals mentioned. It has been found particularly advantageous as regards the stabilizing effect to use magnesium and/or zinc ions in conjunction with aluminum and/or ferric iron ions. By this means certain favorable mixture proportions can be introduced for stabilizing the dicalcium phosphate. Thus, for example in the case of the joint use of magnesium and aluminum ions the most advantageous molecular ratio of Mg:Al is 1:1 to 5. On the other hand nickel, cobalt and copper ions, each kind of ion being used separately, have produced an excellent stabilizing effect. It is obvious that the last mentioned ions can be employed at the same time as or jointly with others of the above named metal ions.

It has further been found that for the stabilizer metal ions the ammoniating mixture should preferably have certain optimum pH values when they are introduced. For example, the magnesium and zinc ions are preferably introduced when the pH value is about 3 to 5; aluminum and ferric iron when it is about 2.5 to 3; and nickel cobalt and copper ions when it is about 3 to 5.

That in the process according to the invention considerably smaller quantities of stabilizing metal ions are required than was necessary hitherto for obtaining the same effect, is due to the fact that in the process according to the invention a much more suitable place is chosen for introducing the stabilizing metal ions than was hitherto the case. If, for example, the magnesium, aluminum or ferric iron ions are added to the disintegration mixture—as was previously proposed, that is, before the introduction of the neutralizing agent, a precipitation of silicates and other compounds of the stabilizer cation takes place even before the precipitation of the dicalcium phosphate which is to be protected by the stabilization, so that a considerable quantity of the added stabilizer metal ions is no longer available for the stabilizing action. If, on the other hand, the stabilizer metal ions are added after the neutralization of the disintegration mixture is completed, the stabilizer does not become inactive.

The aforementioned metal ions are added to the ammoniating mixture in the form of their compounds which are soluble in the reagent, especially in the form of their sulphates, nitrates or chlorides.

The ions of one or more of the above-mentioned metals can also be added in the form of acid or alkaline disintegration products of such substances, especially mineral substances which contain one or more of the above-mentioned metals, preferably in a suitable quantitative ratio.

It has been discovered that in the production of N-P-K composite fertilizers, both the ammoniating process and also the stabilization are considerably assisted by the fact that the technical potash salts of commercial quality are added to the ammoniating mixture, not after the termination of the ammoniating process but during the ammoniating process at pH values of 4 to 6.4, preferably 4 to 6. Either a portion or even the entire quantity of commercial potash salt which is required for producing a certain $K_2O$ content in the composite fertilizer, can be introduced into the ammoniating mixture at the above-mentioned pH values.

The process according to the invention can be carried out intermittently or continuously. If the process is continuous the ammonation is preferably carried out in several containers connected in series and which are equipped with suitable intermixing devices. Certain pH value stages, rising from the first to the last container, are obtained by suitable regulation of the ammonia feed to the individual containers, the addition of the stabilizer metal ions preferably taking place, according to the number of ammoniating containers used, in that container in which the contents have the pH value most suitable for activating the particular stabilizer.

*Examples*

(1) 236 kgs. of Morocco phosphate containing 33% $P_2O_5$ are treated with 522 kgs. of nitric acid (52%) together with 84 kgs. of phosphoric acid (69%) and 31 kgs. of sulphuric acid (80%).

Into this disintegration mixture 73 kgs. of ammonia are introduced under vigorous mixing. As soon as the ammoniating mixture has reached a pH value of about 4.8, 11 kgs. of hydrated magnesium sulphate are introduced into the reaction mass.

When the ammoniating process is terminated the pasty mixture (pH value about 6.5) is treated with a suitable quantity of resultant material of small particle size, i.e. "fines" and granulated and dried in known manner.

A composite fertilizer with 18.5% N and 18.5% $P_2O_5$ is obtained in which 98.7% of the entire quantity of phosphoric acid is soluble in ammonium citrate solution.

(2) In a second example, the quantities of crude phosphate and mineral acids used are the same as in Example 1.

The procedure is the same as in Example 1 with the only difference that 23 kgs. of crystallized aluminum sulphate are added to the ammoniating mixture on attaining a pH value of about 3.0, and 5.6 kgs. of crystallized magnesium sulphate after a pH value of about 4.8 has been reached.

The ammoniating mixture, after a suitable quantity of fines has been added, is granulated and dried in known manner.

Again a composite fertilizer with 18.5% N and 18.5% $P_2O_5$ is obtained in which 98.8% of the whole quantity of phosphoric acid is soluble in ammonium citrate solution.

(3) In a third example, the quantities of crude phosphate and mineral acids used are the same as in Example 1.

The procedure is the same as in Example 1, except that a quantity of 15 kgs. of hydrated cobalt sulphate is added to the ammoniating mixture on attaining a pH value of about 3.4.

The ammoniating mixture, after a suitable quantity of fines has been added, is granulated and dried in known manner.

A composite fertilizer with 18.5% N and 18.5% $P_2O_5$ is obtained in which 98.9% of the entire phosphoric acid is soluble in ammonium citrate solution.

(4) In a fourth example, the quantities of crude phosphate and mineral acids are the same as in Example 1.

73 kgs. ammonia are introduced into the disintegration mixture under intensive mixing. As soon as the ammoniating mixture has attained a pH value of about 4.8, 8.3 kgs. of hydrated magnesium sulphate are added to the reaction mass. On reaching a pH value of about 5.4, 345 kgs. of industrial potassium chloride are added to the ammoniating mixture. The ammoniating mixture, after a suitable quantity of fines has been added, is granulated and dried in known manner.

A composite fertilizer is obtained also with about 12% N, 12% $P_2O_5$ and 20% $K_2O$, in which 98.8% of the entire quantity of phosphoric acid is soluble in ammonium citrate solution.

(5) In a fifth example, the quantities of crude phosphate, mineral acids and added commercial grade potassium chloride are the same as in the fourth example.

The procedure is the same as in the fourth example, except that a quantity of 22.6 kgs. of crystallized aluminum sulphate is added to the ammoniating mixture as soon as a pH value of about 3 is reached and a quantity of 4.2 kgs. crystallized magnesium sulphate when a pH value of about 4.8 is attained. The point where the commercial grade potassium chloride is introduced is the same as in the fourth example. The ammoniating mixture mixed with a suitable quantity of fines is granulated and dried in known manner.

(6) In a further sixth example, the quantities of crude phosphate, mineral acids and added commercial grade potassium chloride used are the same as in the fourth example.

The procedure is also the same as in the fourth example with the difference that a quantity of 12.0 kgs. of hydrated cobalt sulphate is added to the ammoniating mixture on reaching a pH value of about 3.4. The point where the commercial grade potassium chloride is added is the same as in the fourth example.

The ammoniating mixture is mixed with a suitable quantity of fines and granulated and dried in known manner.

Again a composite fertilizer with about 12% N, 12% $P_2O_5$ and 20% $K_2O$ is obtained in which 98.8% of the total quantity of phosphoric acid is soluble in ammonium citrate solution.

All the pH values, cited in the specification and in the claims are determined by the method described in the German Patent 621,586. By this method the pH value is determined in a sample diluted by the hundredfold quantity of water.

When in the specification and in the appended claims the term "stabilizing metal" is used, it is intended to refer to one or more of the following metals: magnesium, aluminum and cobalt.

The above examples illustrate the extent to which the process may be varied without departing from the scope of the invention as defined in the following claims.

What we claim is:

1. The process of producing phosphate-containing fertilizers in which the ratio of calcium other than sulphate, to the phosphorus pentoxide present is from 1.5 to 2.4, which consists in decomposing crude phosphates with a mixed acid containing nitric acid and at least one acid from the group consisting of sulphuric and phosphoric acids, ammoniating the resultant mixture and during the ammoniation when the pH is between 2.5 and 6.4, adding a soluble compound of a stabilizing metal selected from the group consisting of magnesium, aluminum, and cobalt in such quantity that it amounts to from 4 to 8 gram-molecules of said stabilizing metal ions to 100 gram-molecules of the total quantity of phosphorus pentoxide present and continuing ammoniation to complete neutralization.

2. The process of producing phosphate-containing fertilizers in which the ratio of calcium other than sulphate, to the phosphorus pentoxide present is from 1.5 to 2.4, which consists in decomposing crude phosphates with a mixed acid containing nitric acid and at least one acid from the group consisting of sulphuric and phosphoric acids, ammoniating the resultant mixture and during the ammoniation when the pH is between 2.5 and 6.4, adding soluble compounds of at least two of the stabilizing metals selected from the group consisting of magnesium, aluminum, and cobalt, in such quantities that they amount to from 4 to 8 gram-molecules of said stabilizing metal ions to 100 gram-molecules of the total quantity of phosphorus pentoxide present and continuing ammoniation to complete neutralization.

3. The process of producing phosphate-containing fertilizers in which the ratio of calcium other than sulphate to the phosphorus pentoxide present is from 1.5 to 2.4, which consists in decomposing crude phosphates with a mixed acid containing nitric acid and at least one acid from the group consisting of sulphuric and phosphoric acids, ammoniating the resultant mixture, and during the ammoniation when the pH is between 2.5 and 6.4, adding a soluble compound of a stabilizing metal selected from the group consisting of magnesium, aluminum, and cobalt in such quantity that it amounts to from 4 to 8 gram-molecules of said stabilizing metal ions to 100 gram-molecules of the total quantity of phosphorus pentoxide, and in addition when the pH is between 4.0 and 6.4, adding a potassium salt in such quantity that it amounts to from 150 to 300 gram-molecules of potassium oxide to 100 gram-molecules of the total quantity of phosphorus pentoxide present and continuing ammoniation to complete neutralization.

4. The process of producing phosphate-containing fertilizers in which the ratio of calcium other than sulphate, to the phosphorus pentoxide present is from 1.5 to 2.4, which consists in decomposing crude phosphates with a mixed acid containing nitric acid and at least one acid from the group consisting of sulphuric and phosphoric acids, ammoniating the resultant mixture and during the ammoniation when the pH is between 2.5 and 6.4, adding a soluble compound of a stabilizing metal selected from the group consisting of magnesium, aluminum, and cobalt in such quantity that it amounts to from 4 to 8 gram-molecules of said stabilizing metal ions to 100 gram-molecules of the total quantity of phosphorus pentoxide, continuing ammoniation to complete neutralization, then granulating and drying the resultant product.

5. The process of producing phosphate-containing fertilizers in which the ratio of calcium, other than sulphate, to the phosphorus pentoxide present is from 1.5 to 2.4 which consists in decomposing crude phosphates in mixed nitric, phosphoric and sulphuric acids, ammoniating the resulting mixture and during the ammoniation when the pH is between 2.5 and 6.4, adding a soluble compound of a stabilizing metal selected from the group consisting of magnesium, aluminum, and cobalt in such quantity that it amounts to from 4 to 8 gram-molecules of said stabilizing metal ions to 100 gram-molecules of the total quantity of phosphorus pentoxide, continuing ammoniation to complete neutralization, then granulating and drying the resultant product.

6. The process of producing phosphate-containing fertilizers in which the ratio of calcium, other than sulphate, to the phosphorus pentoxide present is from 1.5 to 2.4 which consists in decomposing crude phosphates in mixed nitric and phosphoric acids, ammoniating the resulting mixture and during the ammoniation when the pH is between 2.5 and 6.4, adding a soluble compound of a stabilizing metal selected from the group consisting of magnesium, aluminum, and cobalt in such quantity that it amounts to from 4 to 8 gram-molecules of said stabilizing metal ions to 100 gram-molecules of the total quantity of phosphorus pentoxide, continuing ammoniation to complete neutralization, then granulating and drying the resultant product.

7. The process of producing phosphate-containing fertilizers in which the ratio of calcium, other than sulphate, to the phosphorus pentoxide present is from 1.5 to 2.4 which consists in decomposing crude phosphates in mixed nitric and sulphuric acids, ammoniating the resulting mixture and during the ammoniation when the pH is between 2.5 and 6.4, adding a soluble compound of a stabilizing metal selected from the group consisting of magnesium, aluminum, and cobalt in such quantity that it amounts to from 4 to 8 gram-molecules of said stabilizing metal ions to 100 gram-molecules of the total quantity of phosphorus pentoxide, continuing ammoniation to complete neutralization, then granulating and drying the resultant product.

8. The process of producing phosphate-containing fertilizers in which the ratio of calcium other than sulphate, to the phosphorus pentoxide present is from 1.5 to 2.4, which consists in decomposing crude phosphate with a mixed acid containing nitric acid and at least one acid from the group consisting of sulphuric and phosphoric acids, ammoniating the resultant mixture and during the ammoniation with the pH is between 2.5 and 6.4, adding magnesium in the form of a compound soluble in the ammoniation mixture in such quantity that it amounts to from 4 to 8 molecules of magnesium to 100 molecules of $P_2O_5$ present in the mass and continuing ammoniation to complete neutralization.

9. The process of producing phosphate-containing fertilizers in which the ratio of calcium other than sulphate, to the phosphorous pentoxide present is from 1.5 to 2.4, which consists in decomposing crude phosphate with a mixture of inorganic acids including nitric acid, ammoniating the resulting mixture and during the ammoniation when the pH is between 2.5 and 6.4, adding cobalt in the form of a compound soluble in the ammoniation mixture in such quantity that it amounts to from 4 to 8 molecules of cobalt to 100 molecules of $P_2O_5$ present in the mass and continuing ammoniation to complete neutralization.

10. The process of producing phosphate-containing fertilizers in which the ratio of calcium other than sulphate, to the phosphorous pentoxide present is from 1.5 to 2.4, which consists in decomposing crude phosphate with a mixed acid containing nitric acid and at least one acid from the group consisting of sulphuric and phosphoric acids, ammoniating the resultant mixture and during the ammoniation when the pH is approximately 4.8, adding hydrated magnesium sulphate in such quantity that it amounts to from 4 to 8 gram-molecules of magnesium to 100 gram-molecules of $P_2O_5$ present, continuing the ammoniation to approximately pH 5.4, adding potassium chloride, continuing ammoniation to complete neutralization and drying the resultant product.

11. The process of producing phosphate-containing fertilizers in which the ratio of calcium other than sulphate, to the phosphorous pentoxide present is from 1.5 to 2.4, which consists in decomposing crude phosphate with a mixture of inorganic acids including nitric acid, ammoniating the resultant mixture and during the ammoniation when the pH is approximately 3.4, adding hydrated cobalt sulphate in such quantity that it amounts to from 4 to 8 gram-molecules of cobalt to 100 gram-molecules of $P_2O_5$ present, continuing the ammoniation to approximately a pH of 5.4, adding potassium chloride, continuing ammoniation to complete neutralization and drying the resultant product.

12. The process of producing phosphate-containing fertilizers in which the ratio of calcium other than sulphate to the phosphorous pentoxide present is from 1.5 to 2.4, which consists in decomposing crude phosphate with a mixture of inorganic acids including nitric acid, ammoniating the resultant mixture and during the ammoniation when the pH is approximately 3.00, adding aluminum sulphate in such quantity that it amounts to from 4 to 8 molecules of aluminum to 100 molecules of $P_2O_5$ present in the mass and continuing ammoniation to complete neutralization.

References Cited in the file of this patent

UNITED STATES PATENTS

| 1,948,520 | Harvey | Feb. 27, 1934 |
| 2,738,265 | Nielsson | Mar. 13, 1956 |
| 2,739,054 | Andres et al. | Mar. 20, 1956 |
| 2,769,703 | Andres et al. | Nov. 6, 1956 |

FOREIGN PATENTS

| 1,041,400 | France | Oct. 22, 1953 |